United States Patent
Dingman et al.

(10) Patent No.: US 6,379,738 B1
(45) Date of Patent: Apr. 30, 2002

(54) MEAT EMULSION PRODUCT

(75) Inventors: Steve E. Dingman; Steve G. May; Sheri L. Smithey, all of St. Joseph, MO (US)

(73) Assignee: Nestec S.A. (CH)

( * ) Notice: Subject to any disclaimer, the term of this patent is extended or adjusted under 35 U.S.C. 154(b) by 0 days.

(21) Appl. No.: 09/441,246

(22) Filed: Nov. 16, 1999

(51) Int. Cl.[7] .................. A23J 1/02
(52) U.S. Cl. ............ 426/646; 426/574; 426/513; 426/517
(58) Field of Search ............... 426/105, 574, 426/623, 630, 635, 644, 513, 516, 517, 802, 805, 104, 646

(56) References Cited

U.S. PATENT DOCUMENTS

| | | | |
|---|---|---|---|
| 3,047,395 A | 7/1962 | Rusoff et al. | 426/104 |
| 3,197,310 A | 7/1965 | Kjelson | 426/250 |
| 3,645,747 A | 2/1972 | Palmer | 426/618 |
| 3,814,823 A | 6/1974 | Yang et al. | 426/601 |
| 3,886,298 A | 5/1975 | Hayes, Jr. et al. | 426/656 |
| 3,900,576 A * | 8/1975 | Schulz | 426/311 |
| 3,968,269 A * | 7/1976 | Payne et al. | 426/629 |
| 3,991,221 A | 11/1976 | Waggle et al. | |
| 4,125,630 A | 11/1978 | Orthoefer | 426/104 |
| 4,238,515 A | 12/1980 | Shemer | 426/104 |
| 4,615,901 A | 10/1986 | Yoshioka et al. | 426/656 |
| 4,781,939 A | 11/1988 | Martin et al. | 426/646 |
| 4,820,535 A * | 4/1989 | Gibson | 426/272 |
| 4,895,731 A * | 1/1990 | Baker et al. | 426/641 |
| 4,910,040 A | 3/1990 | Sagarino et al. | 333/26 |
| 4,938,976 A | 7/1990 | Shemer | 426/104 |
| 5,676,987 A * | 10/1997 | Lai | 426/104 |
| 5,762,993 A * | 6/1998 | Gundlach et al. | 426/646 |

FOREIGN PATENT DOCUMENTS

| | | | | |
|---|---|---|---|---|
| EP | 0265740 | * | 5/1988 | A23L/1/317 |
| EP | 0 847 703 | | 6/1998 | |
| EP | 0 990 394 | | 3/2000 | |
| GB | 1 265 661 | | 3/1972 | |
| GB | 1 327 762 | | 8/1973 | |
| WO | 99/13735 | | 3/1999 | A23J/3/14 |

* cited by examiner

*Primary Examiner*—Nina Bhat
(74) *Attorney, Agent, or Firm*—Bell, Boyd & Lloyd LLC

(57) ABSTRACT

Methods for producing meat emulsion products as well as products so produced are disclosed. Meat emulsion products are produced that have realistic fiber definition. The meat emulsion product comprises a body member including protein and fat and having a plurality of linear strands of fiber-like material affording the meat emulsion product a realistic meat-like appearance.

13 Claims, 3 Drawing Sheets

MEAT EMULSION PRODUCT

BACKGROUND OF THE INVENTION

The present invention relates generally to food products. More specifically, the present invention relates to the production of a meat emulsion product having a meat-like appearance and texture, and products so produced.

It is known to produce meat emulsions in the food industry. Meat emulsions are widely used in the production of products such as bologna, frankfurters, and other sausage products. Additionally, such meat emulsion products are used to produce pet foods.

Typically, meat emulsion products are prepared by mixing, chopping, and emulsifying a mixture of raw meat materials such as lean skeletal beef and pork, and meat by-products, with ice, salt, spices, and curing salts in such a manner as to produce an emulsion that contains fine fat particles coated with protein dissolved from meat ingredients. In the case of a sausage product, the resultant meat emulsion is then stuffed into a suitable casing, that serves as a processing mold. The casing is then heated at increasing temperatures, for example 55 C to 77 C, for extended periods of time, which may vary between 1 to 8 hours or more, depending on the volume of meat emulsion being processed.

The heating of the meat emulsion, causes the protein contained therein to coagulate or to set solid. This thereby entraps the fat particles in the protein matrix thereby forming a firm meat emulsion product. The resultant meat emulsion products are a uniform homogeneous mass which contains no discrete particles of meat and retains the shape of the casing when set.

In order to reduce the cost of certain food products to consumers, in recent years, there has been a demand for meat emulsion products that resemble chunks or pieces of natural meat in appearance, texture, and physical structure. Such products are used as a partial or complete replacement for more expensive natural meat chunks in food products such as stews, pot pies, casseroles, canned foods, and pet food products. Chunky meat products are highly desirable in human foods and pet foods, both for aesthetic quality and consumer appeal. These chunky products provide a more economical product which attempts to simulate natural meat chunks in shape, appearance, and texture. It is highly desirable that these products retain their shape, appearance, and texture when subjected to commercial canning and retorting procedures.

Efforts directed to providing such simulated natural meat chunks have included producing such products from vegetable protein sources using extrusion-expansion techniques. Such products have met with some acceptance in the food industry, but they have been limited primarily to use as meat extenders; products produced using vegetable protein sources in an extrusion-expansion procedure lack the appearance and texture of natural meat and therefore are generally not suitable as full substitutes for meat.

Similarly, meat extrusion products, based on meat protein, produced by conventional procedures have not been entirely satisfactory. These products are in the form of a uniform, homogeneous mass, and lack the structure, texture, and appearance of naturalmeat chunks. Therefore, these products are not suitable for use in applications in which the use of simulated meat chunks is desired.

One attempt to improve such meat emulsion products is disclosed in U.S. Pat. No. 4,781,939. This patent discloses processing a meat emulsion under conditions which result in the production of a layered, non-expanded product in the form of chunks or pieces which simulate natural meat chunks in texture, appearance, and consistency. The meat emulsion product is in the form of distinct chunks or pieces having a plurality of juxtaposed, manually separable meat-like layers resembling a chunk of natural meat in appearance, texture, and consistency. The meat emulsion chunks are suitable for use as a partial or complete replacement for more expensive natural meat chunks in both human foods and animal foods. They retain their integrity and shape when subjected to commercial canning and sterilization procedures such as those required in the production of canned, high moisture food products.

Although, the products produced by the methods set forth in U.S. Pat. No. 4,781,939 provide meat emulsion chunks that can be used as a replacement for more expensive natural meat chunks in both human foods and animal foods, such products still do not entirely simulate a meat-like product, and may not have as strong of bite/mouth feel as a real meat chunk. In this regard, such products do not entirely simulate muscle meat which includes a plurality of linear fiber bundles or strands.

Therefore, there is a need for an improved meat emulsion product and method making same.

SUMMARY OF THE INVENTION

The present invention provides improved methods for producing meat emulsion products as well as products so produced. Pursuant to the present invention, meat emulsion products are produced that have realistic fiber definition in contrast to meat emulsions produced heretofore. This fiber definition provides a very realistic meat-like image similar to that of muscle meat. The resultant product also has a stronger bite/mouth feel and is not pasty, mushy or brittle as compared to other meat emulsion products.

To this end, in an embodiment, the present invention provides a meat emulsion product comprising a body defined, at least in part, by a plurality of fiber-like material and comprising at least 29% protein by weight and not more than 6% fat by weight.

In an embodiment of the invention, the product is a pet food.

In an embodiment of the invention, the protein is derived from beef, pork, or poultry meat.

In an embodiment of the invention, the product comprises approximately 52% to about 56% by weight moisture.

In an embodiment of the invention, the meat emulsion includes at least one proteinaceous material. In an embodiment, the proteinaceous material comprises approximately 25% to about 55% by weight of the product.

In another embodiment, the present invention provides a meat emulsion product comprising a body member including protein and fat and having a plurality of linear strands of fiber-like material affording the meat emulsion product a realistic meat-like appearance.

In an embodiment of the invention, the protein comprises approximately 29% to about 31% by weight of the meat emulsion product.

In an embodiment of the invention, the fat comprises approximately 4% to about 6% by weight of the meat emulsion product.

In an embodiment of the invention, the meat emulsion comprises approximately 52% to about 56% by weight moisture.

In yet a further embodiment of the present invention, a method for producing meat emulsion products having a realistic meat-like image is provided. The method comprises the steps of: forming a meat emulsion containing protein and fat; comminuting and heating the emulsion to a temperature of at least 132° F.; introducing the emulsion into a processing zone where it is subjected to a pressure of at least 100 psi; and discharging the emulsion.

In an embodiment of the method, the emulsion, after it is discharged, is subjected to an incomplete shredding. In an embodiment, the incomplete shredding step includes placing the emulsion through compression rolls.

In an embodiment of the method, the meat emulsion includes at least 29% by weight protein and at least 6% by weight fat.

Accordingly, it is an advantage of the present invention to provide an improved meat emulsion product.

Another advantage of the present invention is to provide an improved method for manufacturing meat emulsion products.

Moreover, an advantage of the present invention is to provide a meat emulsion product that simulates muscle meat.

A still further advantage of the present invention is to provide a meat emulsion product that has a very realistic, meat-like image.

A further advantage of the present invention is to provide a meat emulsion product that has a very realistic meat-like image and retains its integrity and shape when subjected to commercial canning and sterilization procedures such as those required in the production of canned high-moisture food products.

An additional advantage of the present invention is to provide a meat emulsion that can be dried and used to product a dried pet food.

Another advantage of the present invention is to provide a meat emulsion product that can be fried and used to produce a dried pet food or treat.

Furthermore, an advantage of the present invention is to provide a meat emulsion product that can be used in pet foods.

Another advantage of the present invention is to provide a meat emulsion product that has a stronger bite/mouth feel than typical meat emulsion products produced heretofore.

A further advantage of the present invention is to provide a meat emulsion that can simulate poultry, pork, beef, or other meat.

These and other advantages of the present invention are disclosed in and will be apparent from the detailed description of the presently preferred embodiments and the drawings.

DETAILED DESCRIPTION OF THE DRAWINGS PRESENTLY PREFERRED EMBODIMENTS

The present invention provide s imp roved meat emulsion products as well as methods for manufacturing same . In a preferred embodiment, the meat emulsion products are designed for canned pet food. However, it should be noted that the present invention can produce meat emulsion for human consumption. The meat emulsion product can simulate any type of meat products including poultry, beef, pork, and even fish.

As set forth in detail below, generally the meat products are produced by emulsifying meat, protein, water, and various ingredients. The emulsion is then run through a high speed emulsion mill wherein the emulsion is rapidly heated to thermally gel it. The heated emulsion is then discharged into a hold tube in which it solidifies into a striated meat-like structure.

As is set forth in detail below, pursuant to the present invention a meat emulsion product is produced that has improved fiber definition (visible small diameter fibers) that afford the product a very realistic meat-like image. In this regard, the resultant meat emulsion product has fiber bundles or strands that afford the meat emulsion a very realistic muscle meat appearance. It is believed that for a resultant poultry meat emulsion product that the product of the present invention has the appearance of tender slow cooked chicken or turkey that was hand-pulled from the bone covered in its own broth/juice. Pursuant to the present invention, additionally, a meat emulsion product is produced that has irregular product shape and dimensions, having a stronger bite/mouth feel and is not pasty, mushy or brittle.

Figure 1:
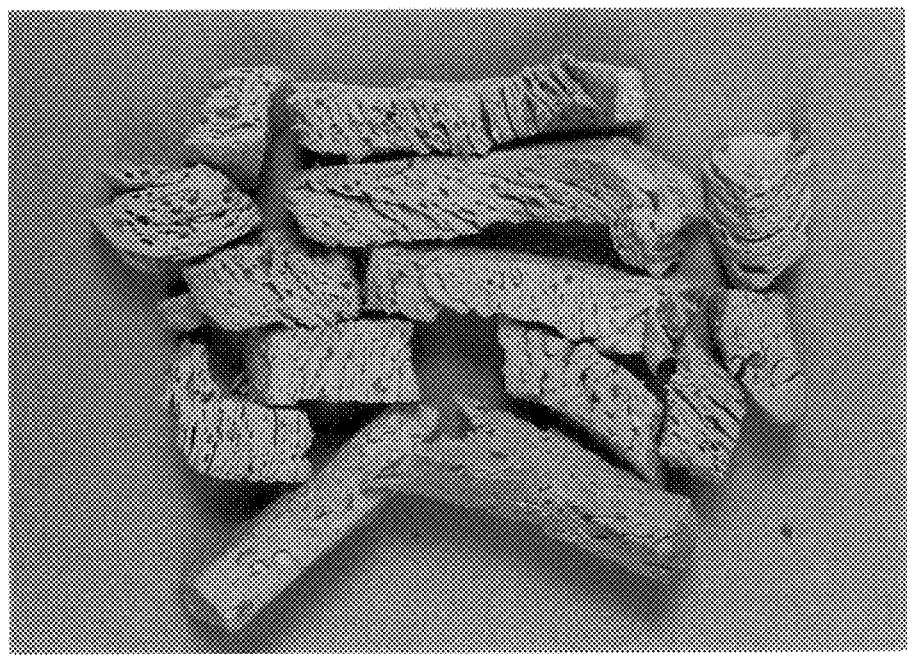
FIG. 1 is a photograph of a prior art meat emulsion product.

Referring to the figures, FIG. 1 illustrates a prior art meat emulsion product. As set forth in the photograph, the product does not include any fibers, but rather has a homogeneous like structure.

Figure 2:
FIG. 2 is a photograph of an embodiment of a meat emulsion product of the present invention.

FIG. 2 illustrates a meat emulsion product of the present invention. As can be seen in the photograph, the product has a plurality of strands of fibers that are linearly arranged in bundles. This provides a more realistic meat-like product than the meat emulsion of FIG. 1.

In preparing the meat emulsion product in accordance with the method of the present invention, a mixture of natural meat materials, including meat from mammals, fish, or fowl and/or meat by-products, having the requisite quality, ingredient cost and palatability, is formulated, ground, and emulsified. The meat and/or meat by-products used may be selected from a wide range of components, with the type and amount of meat material used in the formulation depending on a number of consideration such as the intended use of the product, the desired flavor of the product, palatability, cost, availability of ingredients, and the like. Both meat (i.e. skeletal tissue and non-skeletal muscle) from a variety of mammals, fowl, and fish, and/or meat by-products (i.e. the non-rendered clean parts, other than meat, derived from slaughtered mammals, fowl, or fish) may be used as the meat material. Thus, the term meat material as used herein is understood to refer to non-dehydrated meat and/or meat by-products, including frozen materials.

If the product is intended for human consumption, any of the meats and meat by products used in the production of conventional meat emulsion products may be used in the present invention, including meats such as whole-carcass beef and mutton, lean pork trim, beef shanks, veal, beef and pork cheek meat, and meat by-products such as lips, tripe, hearts, and tongues. If the product is intended for use as a pet food product, the meat mix may contain, in addition to the meat materials described above, any of the meat by-products which are approved for use in animal foods, such as mechanically deboned beef, chicken, fish, beef and pork liver, lungs, kidney, and the like. Typically the meat material is formulated to contain a maximum of about 25%, and preferably below about 15%, by weight of fat.

Additives which are used in conventional meat emulsion products may be mixed with the meat material and included in the meat emulsion of the present invention. These additives include salt, spices, seasoning, sugar, and the like in amounts sufficient to provide the product with desired taste characteristics. In addition, minor amounts of other dry ingredients such as, for example, vitamins, minerals, flavors, and the like, may also be added to the meat emulsion.

The meat emulsion may also include one or more dry proteinaceous materials, such as, for example, wheat gluten, soy flour, soy protein concentrate, soy protein isolate, egg albumin, and nonfat dry milk to improve emulsion stability and binding, impart flavor, and reduce formulation costs. The inclusion of the dry proteinaceous materials in the meat emulsion is particularly advantageous in the production of product intended for use as a pet food. Dry proteinaceous material enables the processor to use meat materials having a protein to fat ratio and myosin to total protein ratio which would otherwise be of marginal acceptability for use in preparing meat emulsion products. If a dry proteinaceous material is included in the meat emulsion, the amount used may vary from about 5% to about 35% by weight of the emulsion, depending on such factors as the intended use of the product, the quality of meat material used in the emulsion, ingredient cost considerations, and the like. In a preferred embodiment, the level of dry proteinaceous material is between approximately 28 to about 31% by weight. Generally, as the fat content and/or moisture content of the meat material used are increased, the level of dry proteinaceous material in the emulsion is increased accordingly.

While the formulation of the meat emulsion may vary widely, the emulsion, including the dry proteinaceous material, should have a protein to fat ratio sufficient to form a firm meat emulsion product upon coagulation of the protein with no sign of emulsion instability, and the protein content of the emulsion must be such as will enable the emulsion, upon being heated to a temperature above the boiling point of water, to coagulate and form a firm emulsion product within a short period of time, that is, within about 5 minutes, and, preferably within 3 minutes, after being heated to such a temperature. Thus, the meat materials and the additives, including the dry proteinaceous material (if used) are mixed together in proportions such that the meat material is present in an amount of between about 50% to 75% by weight, and preferably from about 60% to about 70% by weight of the meat emulsion. In a preferred embodiment, the starting ingredients for the meat emulsion comprise approximately 29 to about 31% by weight protein and approximately 4 to about 6% by weight fat. The resultant meat emulsion product should have a substantially similar profile to that of the starting ingredients; however, if gravy or broth is added to the product, this profile could change due to the moisture, protein and/or fat content of the gravy/broth.

In addition, the meat emulsion should be formulated to contain between about 45% to 80% by weight moisture, with the moisture content preferably being controlled between about 52% to 56% by weight of the meat emulsion, i.e., the meat materials and additives. The exact concentration of water in the emulsion will, of course, depend on the amount of protein and fat in the emulsion.

The meat mix selected for use is passed through a grinder to reduce the meat material into pieces of substantially uniform size. Generally it is preferred to pass the meat through a grinder equipped with a 1 cm or smaller grinding plate. While satisfactory results may be obtained by grinding the meat to a particle size larger than 1 cm, the use of such larger meat particles is generally not preferred. If the meat materials to be used are in a frozen condition, they must first be prebroken or cut into pieces in order to reduce the size of the pieces going into the grinder. While the size of the pieces will depend on the size of the meat grinder intake, normally the frozen meat material is cut into pieces about 10 cm square.

After grinding, the mix of meat particles is conveyed to a mixing tank in which the meat is mixed until uniform, it preferably is heated to a temperature of between about −1° C. to about 7° C., such as by hot water jacketing, steam injection, and the like to facilitate pumping of the meat mix.

The uniform mix of ground meat particles is then comminuted under conditions which emulsify the meat material and form a meat emulsion in which the protein and water of the meat mixture form a matrix that encapsulates the fat globules. The meat material may be emulsified by any conventional procedure and equipment commonly used in meat emulsification such as by using a mixer, blender, grinder, silent cutter chopper, emulsion mill, and the like which is capable of breaking up and dispersing the fat as globules in the protein slurry to form an emulsion.

Typically the temperature of the meat emulsion increases during the emulsification process. This heating of the meat emulsion is not objectionable as long as the temperature does not increase to the point that protein denaturation begins to occur at an undesirable rate at this stage of the process. The temperature of the meat mixture during emulsification should be maintained below about 49° C. in order to minimize protein denaturing at this stage of the process. According to a preferred embodiment of the invention, the meat material is passed through an emulsion mill to emulsify the meat material with the emulsion being heated to a temperature between about 10° C. to about 49° C., preferably between about 21° C. to about 38° C.

The additives to be incorporated in the meat emulsion, including dry proteinaceous material (if used), may be added to the meat mix prior to emulsification. Alternatively, it is frequently preferable to incorporate the additives, particularly the dry proteinaceous material, in the meat mix after emulsification of the meat. Since the addition of the dry proteinaceous material increases the viscosity of the emulsion, better emulsification is obtained when the meat mix is emulsified before the addition of the dry proteinaceous material, which results in the formation of a viscous meat emulsion.

The meat emulsion is again comminuted to increase the fineness of the emulsion and is rapidly heated to a temperature above the boiling point of water, at which temperature the coagulation of protein in the emulsion proceeds so rapidly that the emulsion is set and a firm emulsion product formed within a very short period of time, e.g., 20 seconds or less.

It has been found that rapidly heating the viscous meat emulsion to a temperature above the boiling point of water, and generally between about 120° C. to about 150° C., and more preferably between about 132° C. to about 141° C., will result in the protein in the emulsion coagulating to set the emulsion and form a firm emulsion product within about 5 minutes and typically from a few seconds to about 3 minutes after heating. At this stage in the process, the emulsion is under a pressure of approximately 40 to about 200 psi and preferably 60 to 100 psi. The high temperature, along with increased pressures will provide fiber definition to the product. It has been surprisingly found that the higher the product temperature and pressure the better the fiber development (linear alignment with smaller long fibers).

Preferably the emulsion is processed in equipment wherein the emulsion is heated to such elevated temperatures while it is being comminuted such as by mechanical heating and/or steam injection. According to a preferred embodiment, the viscous meat emulsion, which is at a temperature of between about 30° C. to about 40° C., is pumped through an emulsion mill in which the meat emulsion is subjected to shearing to increase the fineness of the emulsion and almost simultaneously heat the emulsion to between about 120° C. to about 150° C., preferably 132° C. to about 141° C., through rapid mechanical heating and/or steam injection. Thus, the emulsion preferably is heated to such elevated temperatures in a period of less than about 60 seconds. When the emulsion has been heated to such an elevated temperature in this manner, further significant shearing and cutting of the emulsion should be avoided. Control of the emulsion temperature within the desired range can be effected by adjusting such factors as the feed rate into the emulsion mill, the rotational speed of the emulsion mill, and the like, and can readily be determined by those skilled in the art.

The hot meat emulsion, which is at a temperature above the boiling point of water and preferably in the range of between about 120° C. to about 150° C., preferably about 132° C. to about 141° C., is transferred with a positive displacement pump, e.g., a gear or lobe pump, to a holding tube that defines a confined processing zone. The product is pumped at high pressures of 80 psi to about 600 psi, preferably about 100 psi to about 500 psi, and most preferably 140 psi to about 200 psi into the processing zone. At such high pressures, the process operates basically at the emulsifiers upper pressure design limit (235 psi max). For this reason, preferably a gear pump (pressure limit beyond 2500 psi.) is close-coupled directly after the emulsifier. This allows the use of the emulsifier to develop the high temperature without- the high pressure. The pressure will be developed after the gear pump. This thereby reduces the pressures in the emulsifier housing to 60 to 100 psi.

The confined processing zone preferably is in the form of an elongated tube. The emulsion is retained in the confined processing zone at a pressure above the vapor pressure of the emulsion until the protein in the meat emulsion has coagulated sufficiently to set the emulsion and form a firm emulsion product, which retains its shape and structure when discharged from the confined processing zone. At such elevated temperature, protein coagulation proceeds at a very rapid rate.

While the period of time required for the hot emulsion to set sufficiently to form a firm product will depend on a number of factors, such as the temperature to which the emulsion is heated and the amount and type of protein in the emulsion, a residence time of between a few seconds to about 3 minutes, and usually between about 1 to about 1.5 minutes, in the elongated tube is generally sufficient for the protein to sufficiently coagulate and form a firm emulsion product which will retain its shape, integrity, and physical characteristics. The residence time in the elongated tube can be controlled by adjusting the flow rate of the emulsion to the elongated tube and/or by adjusting the length of the elongated tube.

The structure of the elongated tube helps to create the fiber structure of the product. The elongated tube should have a reduced cross-sectional diameter along its length such that the circumference of the tube is smaller as the product proceeds into the tube. In practice, tubes having a length of between about 3.5 m and about 8.0 m and preferably 4.0 m to 6.0 m and an internal diameter of between about 0.5 inch and about 3 inches are believed to function satisfactorily to form a firm emulsion product. Because the tube has a cross-sectional diameter that decreases along its length, or a portion thereof, the product, as it enters the tube, is squeezed as it flows through the tube. The flow rate and differing pressures on the product help create the fiber structure. By way of example, a tube material is used having a diameter of approximately 2.5" at the opening where the product enters the tube and narrows through a conical reducer to a 1" diameter. Tubes of various cross-sectional shapes may be used, such as circular, square, rectangular, and the like as long as a reduction in the diameter is provided.

Preferably the tube is cooled. This allows the product to be cooled as it is forced through the tube. Typically the tube can be cooled by an external jacket or other means. A rectangular or similar shaped tube may provide a preferred design so as to afford a structure that can be externally cooled and allows the product contained in the center of the tube to be sufficiently cooled.

The set meat emulsion pieces discharged from the confined processing zone are in the form of long strips of products having a temperature of about 98° C. to 100° C., and a moisture content of about 50% to 65%, with the pieces varying in size. Upon discharge from the processing zone, the pieces are rapidly cooled by evaporating cooling to a temperature in the range of 83° C. to 93° C. If desired, suitable cutting means, such as a rotary cut-off knife, a water jet knife, a knife grid, or the like may be mounted at the discharge end of the elongated tube to cut the product into pieces of a desired size, e.g. from about 6 inches to about one foot. If desired, the product may be cut down the center to allow the product to more rapidly cool. The meat emulsion chunks thus formed have excellent integrity and strength and will retain their shape and fiber characteristics when subjected to commercial canning and retorting procedures such as those required in the production of canned foods having a high moisture content.

To enhance the fibrous image of the product, a set of compression rolls which consists of two long lightly-toothed cylinders (rolls) that spin at similar speeds can be used. Product that is discharged from the confined processing zone is dropped into a narrow adjustable opening between the spinning cylinders which open up/partially separate/tear the fibers. It has been found that this incomplete shredding functions to emphasize the linear fibers.

The meat emulsion pieces discharged from the confined processing zone may be conveyed to a dryer to remove a large portion of the moisture therefrom, and the dried product collected and stored. Alternatively, the meat emulsion pieces may be conveyed from the elongated tube directly to a canning operation in which chunks are filled into cans together with other ingredients, such as sauce, gravy, and the like, and the cans retorted. In either situation, the product can be resized if desired.

By way of example, in the production of a canned pet food product, a suitable gravy may be prepared by heating a mixture of water, starch, and condiments. The meat emulsion chunks and gravy are filled into cans in the desired proportions, the cans are vacuum sealed and are then retorted under time-temperature conditions sufficient to effect commercial sterilization. Convention retorting procedures may be used. Typically, a retorting temperature of about 118° C. to 121° C. for approximately 40 to 90 minutes is satisfactory in producing a commercially sterile product.

Figure 3:
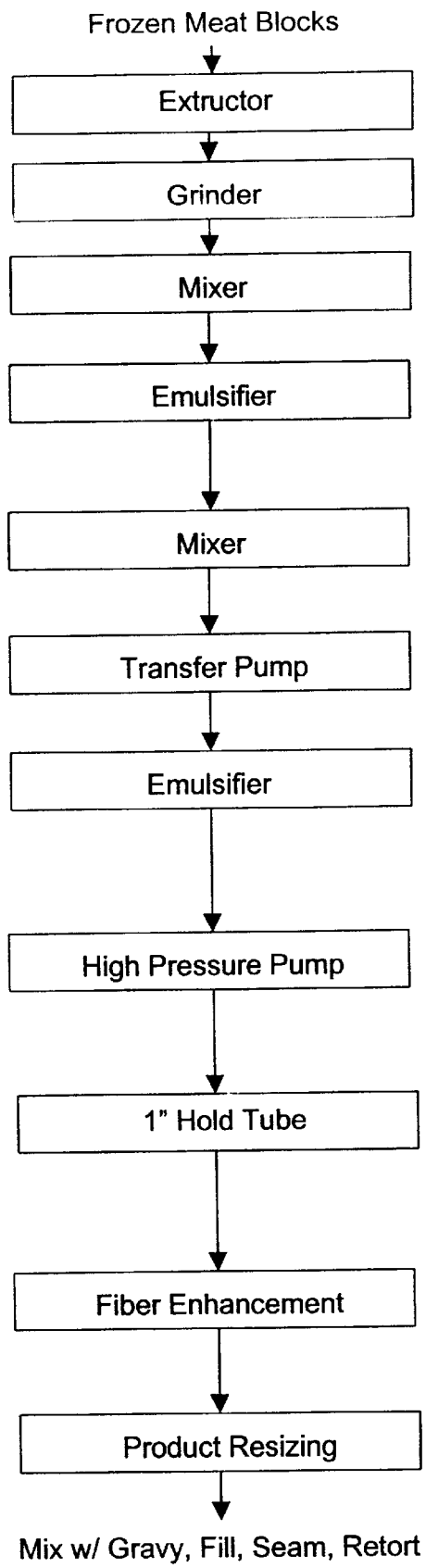
FIG. 3 is a schematic of an embodiment of a process of manufacturing meat emulsion products of the present invention.

FIG. 3 sets forth a flow chart illustrating generally, the process steps of the present invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A meat emulsion product comprising a body defined, at least in part, by a plurality of fibrous structures and comprising at least 29% protein by weight and not more than 6% fat by weight.

2. The meat emulsion product of claim 1 wherein the protein is derived from poultry meat.

3. The meat emulsion product of claim 1 wherein the product is a pet food.

4. The meat emulsion product of claim 1 wherein the product comprises approximately 52% to about 56% by weight moisture.

5. The meat emulsion product of claim 1 including at least one proteinaceous material.

6. The meat emulsion product of claim 5 wherein the proteinaceous material comprises approximately 25% to about 55% by weight of the product.

7. A meat emulsion product comprising a body member including protein and fat and having a plurality of linear strands of fiber-like material affording the meat emulsion product a realistic meat-like appearance.

8. The meat emulsion product of claim 7 wherein the protein comprises approximately 29% to about 31% by weight of the meat emulsion product.

9. The meat emulsion product of claim 7 wherein the fat comprises approximately 4% to about 6% by weight of the meat emulsion product.

10. The meat emulsion product of claim 7 wherein the meat emulsion product comprises approximately 52% to about 56% by weight moisture.

11. The meat emulsion product of claim 7 wherein the product is a pet food.

12. The meat emulsion product of claim 7 wherein the protein is derived, at least in part, from poultry meat.

13. A meat emulsion product comprising a body defined, at least in part, by a plurality of linear strands of fibrous material that affords the meat emulsion product a realistic meat-like appearance and comprising less than 15% fat by weight.

* * * * *